Figure 1:
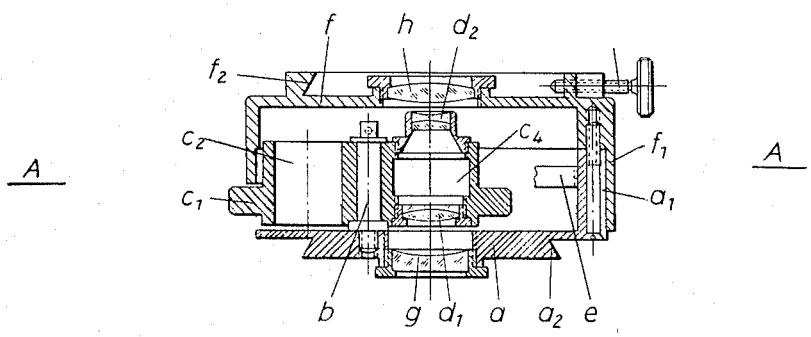

Oct. 11, 1955  K. MICHEL ET AL  2,720,138
SUPPLEMENTARY APPARATUS FOR MICROSCOPES
Filed April 13, 1951

2,720,138

SUPPLEMENTARY APPARATUS FOR MICROSCOPES

Kurt Michel, Gottingen, and Walter Kinder and Heinz Küppenbender, Heidenheim (Brenz), Germany, assignors to Carl Zeiss, Heidenheim (Brenz), Germany Application April 13, 1951, Serial No. 220,756

Claims priority, application Germany April 15, 1950

3 Claims. (Cl. 88—39)

The invention concerns a supplementary apparatus for microscopes, which permits extending the field of application of a microscope. In newer microscopes, as is known, the eyepiece tube as a rule is arranged easily detachable, since one wants to interchange the eyepiece as occasion demands with a different one, say exchange a monocular attachment for a binocular one. This separation possibility, usually already present, can in accordance with the invention be utilized for the purpose of inserting between that part, which carries the objective of the microscope, and the eyepiece tube an intermediate piece as a supplementary apparatus which contains one or more further optical elements, as they are required for special tasks. One can for example mount in such an intermediate piece the analyser for examinations with polarized light, or one can for the purpose of changing the magnification insert a Galilean telescope, and the like. The connecting parts of the supplementary apparatus have on the one side the same formation as the connection end of the eyepiece tube and conversely on the other side the same construction as the connection end of that part, which carries the objective, so that the supplementary apparatus can be inserted or withdrawn in simple manner.

Since such a supplementary apparatus has a certain structural height, on insertion thereof the eyepiece recedes by this structural height from the objective. In order to avoid a readjustment of the microscope due to this longer light path, one will therefore displace the image plane of the objective towards the eyepiece by this amount through installation of at least one lens. Besides the inserted optical elements frequently call for a parallel path of rays, in order to avoid imaging defects. It therefore is to be recommended to equip the supplementary apparatus with two lenses with a refractive power of opposite sign, between which parallel path of rays prevails and between which also the supplementary optical elements are arranged. The two lenses can again be so proportioned that the objective image plane lies correctly with reference to the eyepiece.

Such a supplementary apparatus also offers the possibility of installing not only a single optical element; one can provide several of them and arrange them so that they can be brought selectively into the path of rays of the microscope. A suitable construction results hereby if the various optical elements are mounted on a revolving disc whose axis of rotation is parallel to the microscope axis. Thereby a relatively small structural height of the supplementary apparatus is attainable and the manipulation of the revolving disc is conveniently to be effected from without. Such an arrangement is to be recommended above all when one for the purpose of rapid change in magnification, provides optical systems, e. g. Galilean telescopes, which can be inserted into the path of rays of the microscope. Further there can also be mounted on the revolving disc an imaging system which images the rear focal plane of the objective in the ocular image plane. Therewith one can for example in investigations with polarized light make visible to the eye the appearances arising in the rear focal plane of the objective or in microscopes equipped with a phase contrast arrangement, one can check the position of the condenser diaphragm in reference to the phase contrast diaphragm. Since the position of the rear focal plane in the microscope is dependent on the objective in use at any time, one can also provide a number of such imaging systems, suited to the types of objectives to be employed.

Figure 2:
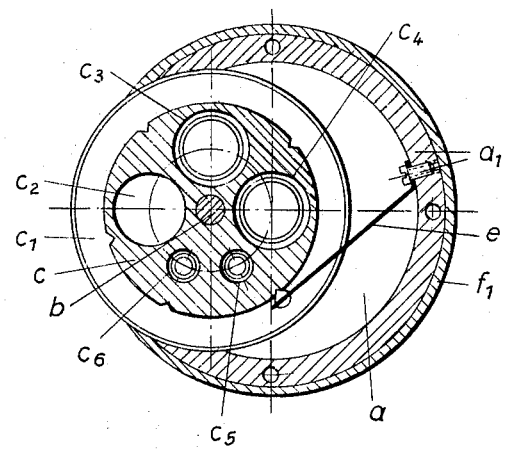

In the accompanying drawing the invention is illustrated by a constructional example. Fig. 1 is a section along the microscope axis, Fig. 2 a cross section according to the line A—A of Fig. 1. A base plate $a$, which is provided with a ring-shaped shoulder $a_1$, with aid of which the plate $a$ can be attached to the tube of a customary microscope in known manner. A bolt $b$ is screwed to the plate $a$ laterally from the microscope axis, and forms the rotation axis for a revolving disc $c$. The disc $c$ is provided with a knurled collar $c_1$ which projects somewhat beyond the rim $a_1$ of the plate $a$. The rim $a_1$ is for this reason correspondingly recessed, so that one can turn the disc $c$ by hand. The disc $c$ possesses parallel to its axis of rotation, five borings $c_2$, $c_3$, $c_4$, $c_5$, and $c_6$, which all have the same distance from the axis of rotation, so that by turning the revolving disc $c$ the borings are brought in turn on the microscope axis. The boring $c_2$ is completely free and permits therefore, when it is turned into the microscope axis, free passage for the light. The borings $c_3$ and $c_4$ contain each a Galilean telescope, with aid of which a rapid change in magnification can be attained. In Fig. 1 the Galilean telescope of boring $c_4$ is to be seen in section consisting of a collecting system $d_1$ and a dispersing system $d_2$. The telescope of boring $c_3$ is similarly executed, however with another magnification. In the borings $c_5$ and $c_6$ are found each a collecting system, which in each case images in the ocular image plane the rear focal plane of the objective for two different objectives. Through that it is possible to make visible to the eye the appearances arising in the rear objective focal plane, thus for example, in working with polarized light, to follow the occurrences in this plane. A leaf spring $e$, which is fastened within to the ring-shaped shoulder $a_1$, assures, with aid of corresponding notches in the disc $c$, in each case the correct position of the employed boring. The hollow space formed by the ring-shaped shoulder $a_1$ is closed towards above by a cap $f$, which with its rim $f_1$ embraces the shoulder $a_1$ and therewith shuts it off to the outside. For passage of the collar $c_1$ the rim $f_1$ is recessed as far as necessary. Further, in a central boring of the base plate $a$, a dispersing lens $g$ is set in, which makes parallel the converging pencil of light coming from below. On the other hand there is located above in the centre of the cap $f$ a collecting lens $h$, which again unites the passing rays in the ocular image plane. The cap $f$ possesses on its upper side a conical recess $f_2$, in which an ocular socket can be inserted in customary manner and fixed by means of a screw $i$. The conical attachment $a_2$ of the base plate $a$ and the conical cutout $f$ of the cap $f_2$ correspond exactly in their dimensions, so that the supplementary apparatus can be inserted or removed as needed between that part, which carries the objective of the microscope, and the ocular collar or taken out.

We claim:

1. A supplementary apparatus for completing the range of application of microscopes having objective and ocular installed in a microscope tube, said tube being divided into two portions, i. e. a lower portion carrying said objective and an upper ocular socket portion carrying said ocular, both said portions having means allowing an easy connecting and disconnecting, said supplementary apparatus being developed as an interchangeable mechanical connecting piece having corresponding means for inserting said apparatus between said disconnected portions and including a plurality of additional optical elements arranged to be selectively inserted in exact optical alignment into the path of imaging rays between said objective and said ocular and influencing the said path of rays e. g. for varying magnification, observing the image side focal plane of said objective, analysing of polarized imaging rays, and the like, said supplementary apparatus including further optical elements for compensating the lengthened microscope light path due to the insertion of said supplementary optical elements, said further optical elements comprising one lens of diverging power and one lens of converging power fixedly connected to a lower and upper opening in said supplementary apparatus respectively such as to cause parallel path of rays between them and to receive either one of said additional optical means in said parallel path of rays.

2. A supplementary apparatus according to claim 1 comprising in a housing a disc and a shaft pivotally mounted in said housing with its axis parallel to and spatially separated from said microscope tube axis and carrying said disc receiving said additional optical means concentrically to said shaft axis, and means for rotating said disc round said shaft axis for selectively inserting either said optical means in the path of microscope imaging rays.

3. A supplementary apparatus according to claim 1 at least including as one said additional optical element an optical member causing an image of the posterior focal plane of said objective in the ocular image plane of said microscope.

References Cited in the file of this patent

UNITED STATES PATENTS

| | | |
|---|---|---|
| 1,549,518 | Steinle | Aug. 11, 1925 |
| 2,237,943 | Lihotzky | Apr. 8, 1941 |
| 2,538,846 | Reardon | Jan. 23, 1951 |